(No Model.)

C. H. O'BRYON.
UNDERGROUND CONDUIT FOR ELECTRIC WIRES.

No. 265,131. Patented Sept. 26, 1882.

WITNESSES:
A. P. Grant,
W. F. Kircher

INVENTOR:
Chas. H. O'Bryon,
BY John A. Wiedersheim
ATTORNEY.

N. PETERS, Photo-Lithographer, Washington, D. C.

UNITED STATES PATENT OFFICE.

CHARLES H. O'BRYON, OF PHILADELPHIA, PENNSYLVANIA, ASSIGNOR OF ONE-HALF TO JOHN E. BROWN, OF SAME PLACE.

UNDERGROUND CONDUIT FOR ELECTRIC WIRES.

SPECIFICATION forming part of Letters Patent No. 265,131, dated September 26, 1882.

Application filed May 23, 1882. (No model.)

*To all whom it may concern:*

Be it known that I, CHARLES H. O'BRYON, a citizen of the United States, residing in the city and county of Philadelphia, State of Pennsylvania, have invented a new and useful Improvement in Underground Conduits for Electric Wires, which improvement is fully set forth in the following specification and accompanying drawings, in which—

Figure 1:
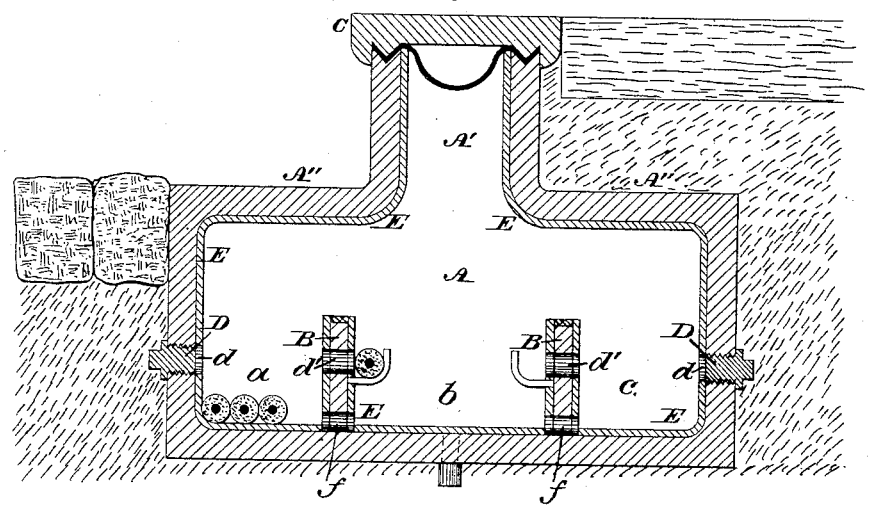
Figure 2:
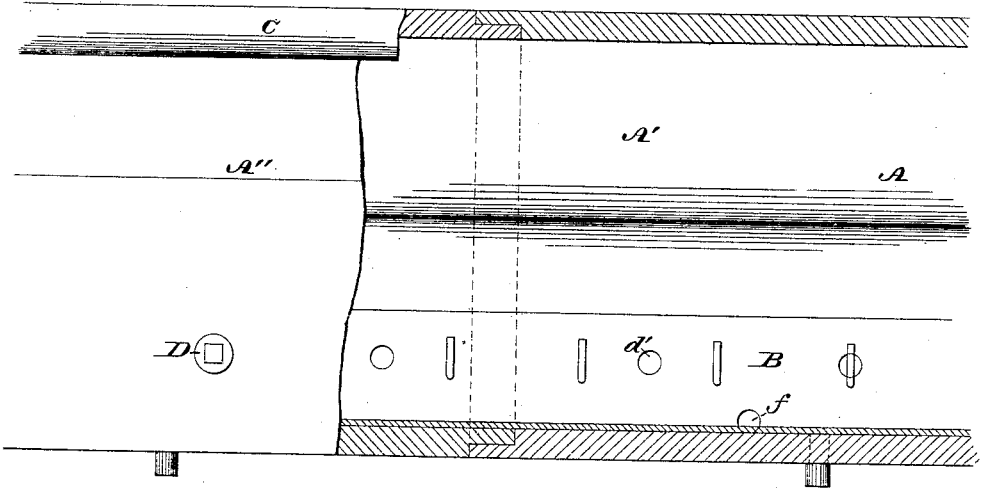
Figure 3:
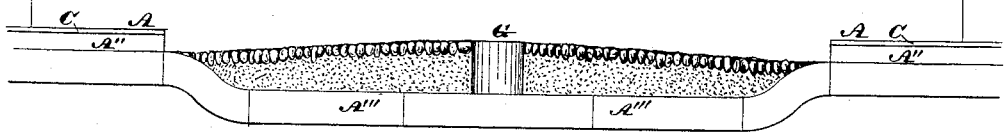
Figure 4:
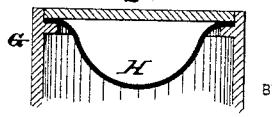

Figure 1 is a transverse vertical section of the conduit embodying my invention. Fig. 2 is a partial side elevation and vertical section thereof. Fig. 3 is a view showing the connection of the conduits at a street crossing. Fig. 4 is a vertical section of a portion of a testing station or vault embodying my invention.

Similar letters of reference indicate corresponding parts in the several figures.

My invention consists of a conduit provided with openings in its side walls, having removable plugs for insertion therein, and partitions erected upon the base of said conduit, which are also provided with openings.

It also consists of a conduit and its cover, in combination with the water-proof material or water-holding receptacle clamped between the conduit and cover, and having its central portion depressed, whereby a water-receptacle is formed immediately beneath the cover, substantially as hereinafter set forth.

Referring to the drawings, A represents a conduit for electric wires, which is formed of lengths of tubes or tubular bodies of metal, concrete, or other suitable material, the upper portion of each of which is contracted to constitute a neck, A', thus leaving shoulders A'' on each side of the neck. From the base of the conduit rise partitions or walls B B, which divide the conduit into chambers $a\ b\ c$ for different kinds of wire.

C represents the lid or cover of the conduit, which rests on the top of the neck A', the joint between them being suitably packed or cemented, or provided with gaskets for preventing the entrance of water into the conduit. In the vertical wall (one or both) of the conduit are openings $d$, which are occupied by plugs D, preferably screw-threaded, whereby access is had to the wires in the chamber $a$ or $c$ of the body of the conduit for the purpose of making connections therewith or branches therefrom, the partitions B also having openings $d$ at coincident places, so that access is had to the wires in the chambers $b$ or $c$ for similar purposes.

The inner face of the conduit A and the faces of the standards B are coated with cement or other suitable material, as at E, whereby water and moisture are prevented from injuring the conduit and parts, and insulation of the wires is effected. Openings $d'$ are also formed in the partitions B, so that the wires may be run from one chamber into the other, and said partitions may have hooks for sustaining the wires, as shown in Fig. 1.

The tubes are laid in lieu of the curb and gutter stones now in use, and in order to form flush and tight joints the contiguous ends of the tubes and covers are lap-jointed or rabbeted or otherwise constructed and sealed or closed. The shoulder A'' of one side of the body constitutes the gutter, and the walls of the neck, in connection with the cover C, serves as the curb of the sidewalk. The shoulder of the other side of the body serves to sustain the ground and sidewalk adjacent to the conduit, the body thus having an increased width without necessarily widening the curb or neck of the body.

Depending from the mouth of the testing station or vault G, or from the cover thereof, is a water-proof material or water-holding receptacle, H, which closes the joint between said vault and cover, and serves to receive water which may accidentally enter at said joint. It is evident that a similar receptacle may be provided at the top of the neck of the conduit.

When either cover is displaced the water in the receptacle may be readily poured off or otherwise removed.

For connecting the ends of the conduits at the crossing of a street or corner thereof I employ a tube, A''', which is sunk below the surface of the street and attached to and communicates with the ends of the conduits A, as shown in Fig. 3, thus providing a continuous conduit.

All of the wires in the conduits are accessible by removing the cover C, so that they may be laid, repaired, removed, examined, and tested without disturbing the street or sidewalk.

Owing to the construction of the body of the conduit, either side may be in front, and thus the conduit may be located and set with ease and facility, a practical and serviceable conduit is produced, and a simple and durable curb and gutter presented.

Having thus described my invention, what I claim as new, and desire to secure by Letters Patent, is—

1. The conduit A, provided with openings in its side walls, having removable plugs for insertion therein, and the partitions erected upon the base of said conduit, and provided with openings $d'$, substantially as and for the purpose set forth.

2. The conduit and its cover, in combination with the water-proof material or water-holding receptacle H, clamped between the conduit and cover, and having its central portion depressed, whereby a water-receptacle is formed immediately beneath the cover, substantially as set forth.

CHAS. H. O'BRYON.

Witnesses:
JOHN A. WIEDERSHEIM,
W. F. KIRCHER.